United States Patent [19]

Dye

[11] 4,330,204
[45] May 18, 1982

[54] SELF-ALIGNING LASER COMMUNICATOR UTILIZING RECIPROCAL TRACKING

[75] Inventor: Richard A. Dye, Santa Barbara, Calif.

[73] Assignee: Santa Barbara Research Center, Goleta, Calif.

[21] Appl. No.: 95,178

[22] Filed: Nov. 16, 1979

[51] Int. Cl.³ .................... G01B 11/26; H04B 9/00
[52] U.S. Cl. .................................. 356/152; 455/607
[58] Field of Search ........................ 356/141, 152; 250/203 R; 455/606, 607, 600, 618, 619, 613; 350/16

[56] References Cited

U.S. PATENT DOCUMENTS

| | | | |
|---|---|---|---|
| 2,982,859 | 5/1961 | Steinbrecher | 250/203 R |
| 3,504,182 | 3/1970 | Pizzurro et al. | 455/606 |
| 3,511,998 | 5/1970 | Smokler | 455/606 |
| 3,652,159 | 3/1972 | Lietar | 356/4 |
| 3,699,341 | 10/1972 | Quillinan | 356/152 |
| 3,703,682 | 11/1972 | Wickman et al. | 356/152 |
| 3,899,145 | 8/1975 | Stephenson | 250/203 R |
| 3,935,818 | 2/1976 | Johnson et al. | 244/3.16 |
| 3,943,360 | 3/1976 | Parkin | 356/152 |

Primary Examiner—S. C. Buczinski
Attorney, Agent, or Firm—Elliott N. Kramsky; David W. Collins; W. H. MacAllister

[57] ABSTRACT

An automatic alignment mechanism for use in a reciprocal tracking laser communicator. A cylindrical transceiver unit having oppositely disposed laser transmitter and detector sections is mounted within an outer cylinder. The outer cylinder has an open end and a closed end with a spherical, mirrored inner surface. Means for mounting the cylindrical transceiver positions the detector facing the mirrored inner surface and constrains the detector to movement in the focal sphere of the mirror. Electromechanical means, responsive to received optical energy reflected by the mirror and focussed onto the detector, rotates the transceiver in accordance with the location of the blur circle of said energy on said detector so that the transceiver is aligned with the source of the optical transmission.

7 Claims, 9 Drawing Figures

SELF-ALIGNING LASER COMMUNICATOR UTILIZING RECIPROCAL TRACKING

TECHNICAL FIELD

The present invention relates to means for automatically aligning a receiver to an incoming laser transmission and, in particular, to means for achieving the automatic self-alignment of a pair of reciprocal tracking transmitter/receivers.

BACKGROUND ART

The need for covert communications, military and civilian is both historic and ever-present. A communication may generally be considered covert if an intruder is unaware of its presence. In measuring covertness, one may consider many parameters such as: (1) probability of interception (intruder's ability to receive a portion of a communication of which he is aware); (2) jamming (intruder's ability to interfere with or limit transmission of information); and (3) spoofing (intruder's ability to interject false information without it being recognized as false).

In attempting to avoid detection by an intruder, a system should attempt to minimize the above-named measures. Any communications system operates within a 5-dimensional space. Thus, a covert system may utilize up to five degrees of freedom to "hide" signal. The five dimensions available are time, frequency, and the three spatial dimensions. The veiling of the signal is commonly accomplished by (1) concentrating all signal energy into a small portion of the total volume of space in the hope than an intruder will not stumble across or, (2) moving the signal energy in some predetermined manner at a rapid rate through as much of the volume (of all five dimensions) as possible. In the latter instance, the intruder is required to observe the total spatial volume (rather than a small portion), thus incurring a reduction in receiver sensitivity. Though effective in many applications, such systems exploit only two of the above-named communication dimensions, frequency and time. In addition, the latter dimension is exploited in only one direction. The three spatial degrees of freedom remain unutilized for concealment due to the finite size of the receiver's antenna. Thus, these techniques are effectively limited to about one and one half dimensions of the five potentially available for hiding a communication.

Optical communications, on the other hand, maintain covertness through the concentration of signal energy into a small portion of space. Though not restricted solely to communication systems, it is well known that a laser system may conveniently achieve a very small energy volume relative to a comparable RF system. As optical systems also possess the ability to take advantage of the non-spatial communication dimensions, laser communication systems exercise all the degrees of freedom available to RF communication systems and more. As an example of the spatial covertness which may be achieved by a laser system, the (three dimensional) volume into which energy is directed by a 10 centimeter antenna at 37.5 GHz is 64,000 times as large as the energy volume produced by the same size antenna (10 centimeter diameter telescope) operating at 30,000 GHz (10 micrometer wavelength). An interceptor utilizing omnidirectional receiving antennas would be assured of location within the radiation field of such a transmitter, allowing the conduct of a systematic frequency search with reasonable assurance of detection. Contrariwise, due to the nature of laser communication, not only does the potential interceptor have to locate himself properly in frequency, time and space: he must also properly orient his antenna field of view to receive the transmitted energy. Thus, his search actually has seven degrees of freedom: the five previously discussed, plus the azimuth and elevation directions of his receiving antenna's field-of-view. This presents a huge, multifaceted problem. (An interceptor utilizing an optical heterodyne receiver has a field-of-view limited to approximately $2.4\lambda \div d$ where $\lambda$ is the wavelength and d is the diameter of the antenna; thus, a 10 centimeter receiving antenna is limited to a field-of-view on the order of 0.015 degrees).

The very desirable directionality of the optical (laser) communication mode, which facilitates the concealment of optical transmissions in space, gives rise to the predictable difficulties of operation found to exist when the field-of-view communications are transmitted between transceivers (transmitter/receivers) having unstable platforms. This situation has recently arisen with regard to the development of lightweight, hand-held optical communicator systems. The possibility of developing a practical line-of-sight optical communicator operable over a range of 5 to 10 miles arose with the development of the gallium arsenide (GaAs) injection laser diode. (A hand-held optical communicator presently available is described in "Gallium Arsenide Laser Communicators for Hand-Held Voice or Fixed-Base Voice/Data Optical Communications" By Robert J. Cinzori (Santa Barbara Research Center Information Paper, March 1974). Optimum covertness is achieved with such a system when the solid angle of the transmission in space is a minimum. The maintenance of small angle of the transmission leaves little margin for the errors incurred through receiver platform instability. The interrelationship of range and energy density imposes a physical limit (in addition to the security considerations which dictate minimal spatial distribution of signal) upon the solid angle of the laser transmission. (It has been found that a communication range of seven miles may be achieved by a present day hand-held optical communicator having a transmission beamwidth of one and one-half degrees. This range is degraded to about one mile when the aperture is increased to four degrees). Thus, to achieve long range optical communication, a substantial stabilizing burden exists in the area of hand-held and related secure transmitter/receiver devices.

SUMMARY OF THE INVENTION

It is therefore an object of the present invention to provide means for stabilizing the line of sight of one or more optical communicators having an otherwise unstable base.

Another object of the present invention is to provide an automatic alignment apparatus for optical systems which employ the reciprocal tracking concept whereby the transmission line-of-sight of a first transceiver is utilized for alignment of a second receiving transceiver.

These and other objects are attained by the present invention wherein there is provided apparatus into which there may be mounted a conventional cylindrical optical or laser communicator including a collinearly mounted laser transmitter and receiver. The apparatus includes a self-correcting mechanism to maintain alignment between two distant communicators, at least one of which is associated with an unstable base.

The alignment apparatus includes an outer cylinder having, oppositely disposed, a closed and an open end. The interior of the closed end is mirrored. Means are provided for rotatably mounting the cylindrical communicator within the outer cylinder so that detected incoming optical energy as modulated or encoded with transmission data, when reflected from the mirrored closed end of said outer cylinder will correctly align the line of sight of the receiving transceiver with the direction of the optical transmission.

Other and further aspects of the present invention will become apparent during the course of the following description and by reference to the accompanying drawings.

BRIEF DESCRIPTION OF THE DRAWINGS

Referring now to the drawings, in which like numerals represent like parts throughout:

In FIG. 6a the transceiver is shown in solid outline prior to the automatic repositioning of the device to the orientation indicated by dashed outlined. FIG. 6b indicates the location of the blur circle upon the detector of the transceiver when misaligned;

DETAILED DESCRIPTION OF THE INVENTION

Figure 1:
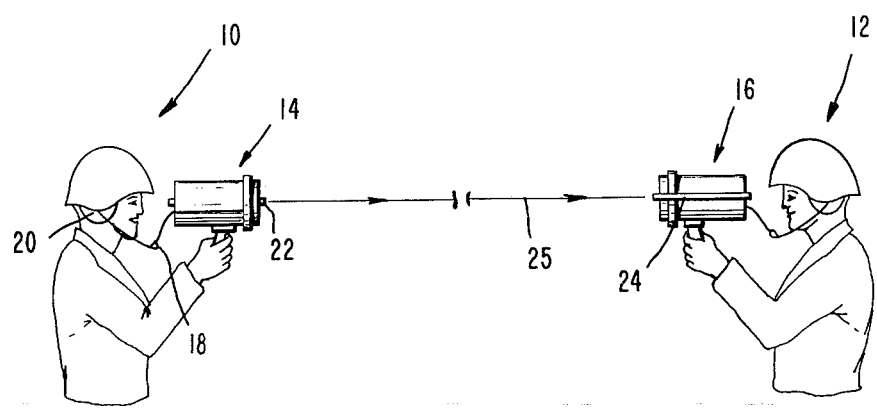
FIG. 1 presents a conceptual view of a field communication by means of a pair of optical communicators each including the alignment apparatus of the present invention whereby a common line-of-sight therebetween is obtained.

FIG. 1 presents a conceptual illustration of communication between a first (speaking or transmitting) operator 10 and a second (receiving or listening) operator 12 by means of the identical optical communicators 14, 16, respectively. It is seen that the communicators 14, 16 present relatively lightweight, compact units which may be hand-held during operation. Such units have been fabricated, generally cylindrical in nature, having a transceiver (not shown in FIG. 1) diameter of 1.6 inches and a length of approximately 7 inches positioned inside an outer cylinder, shown in FIG. 1 having a 3.7 inch diameter and a length of 10 inches. The communicator 14, 16 utilize the monoculars 22, 24 to obtain a rough line of sight therebetween. Each operator is equipped with a headset having an earpiece 20, electrically coupled to the receiver electronics, and a microphone 18, electrically coupled to the transmitter electronics. Essentially, communication of voice is accomplished by transforming the voice of the transmitting operator 10 into a pulsed laser transmission over the optical path or ray 25. This "transformation" of voice or other data into a laser transmission is achieved by means of the modulation of the laser energy which travels over the path 25. The listening operator 12 receives the encoded laser transmission at the detector of his transceiver. The transmitted energy is converted into an electrical signal which, through standard transducer means, is "heard" after demodulation and decoding by the second operator 12 over his headset. Electronics appropriate for the modulation and demodulation of such a pulsed transmission is disclosed, for a multiple signal case, in U. S. patent application, Ser. No. 911,568, by Dye et al for "Apparatus and Method for Ordering Independent Signals". This application, which was filed June 1, 1978 and has been issued as U.S. Pat. No. 4,169,213, is the property of the assignee herein. It is essential that the operators 10, 12 maintain both transceivers housed within the communicators 14, 16 upon approximately coincident optical paths for the effective transmission and detection of the transmitted (laser) energy and associated signal content. The process by which one transmission path 25 of a first transceiver is utilized to orient a second, receiving transceiver is known in the art as "reciprocal tracking".

Figure 2:
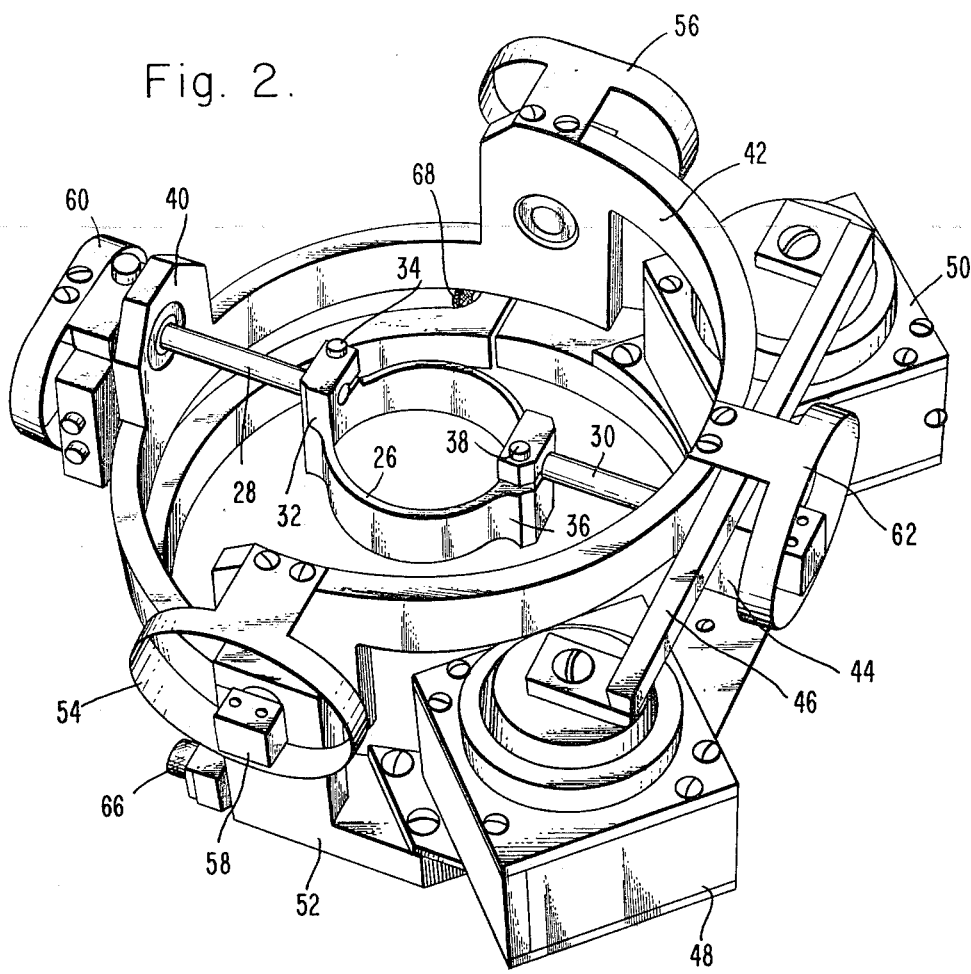
FIG. 2 is a perspective view of the gimbal mechanism of the present invention.

Turning now to FIG. 2, one may observe the gimbal mechanism which constitutes an essential portion of the present invention. The mechanism will be seen, infra, to continuously reposition an inner cylinder (constituting a laser transceiver) within an outer cylindrical housing to achieve automatic and continuous reciprocal tracking of the transmissions of the operators 10, 12. A ring-like holder 26 is provided for retention of the transceiver. The holder 26 may be adjusted for a tight fit on the shafts 28, 30 by means of the upper clamp 32 including the fastening screw 34 by means of the lower clamp 36 including the fastening screw 38 for rotation about the axis formed by and coincident with the thin collinear cylindrical shafts 28, 30. The shafts 28, 30 also provide housings for the wires which connect the (earphone) photodiode/preamplifiers to the receiver electronics and the (microphone) laser pulser to the transmitter electronics. The other end of the upper segment 28 is pivotally engaged to the flange 40 of the gimbal ring 42 while the lower segment 30 is fixedly engaged to the metal block 44. The metal block 44 abuts the differential actuator arm 46 so that pure rotation of the holder 26 in the horizontal plane may be effected by the twisting of the differential actuator arm 46 in the horizontal plane.

Movement of the differential actuator arm 46 is induced by an opposed pair of electromechanical actuators 48, 50, each of which is attached to and abuts the arm 46. The interaction of the actuators 48, 50, which comprise standard means in the art characterized by electrically energized (mechanical) bi-directional loudspeaker movement, will be discussed in more detail infra. Each has the ability to "push" and to "pull" the end of the arm 46 to which it is engaged. The central portion of the arm 46 is, in turn, fixedly engaged to the metal block 44 which abuts the back edge of the lower centering spring 62. Thus, the movement of the holder 26 in both the vertical and horizontal planes (and/or a combination of such movements) can be translated from electromechanical actuator movements. The actuators 48, 50 are situated 45 degrees between the mechanical axes of the gimbal ring 42 (defined by the points of mechanical attachment of the ring 42 to the housing clamp ring 52). Centering springs 54, 56 which join the gimbal ring 42 to the metal block 58 and to an opposed metal block (not shown) fixed to the housing clamp ring 52 provide a horizontal mechanical axis for rotation for the holder 26 in the azimuthal plane while the centering springs 60, 62 engaged to the gimbal ring 42 and housing clamp ring 52, provide a vertical mechanical axis for rotation in the elevation plane. The gimbaling system, just described, is preferably calibrated for an actuator null position wherein the longitudinal axis of the cylindrical holder 26 is coincident with the corresponding axes of the gimbal ring 42 and the housing clamp ring 52.

Figure 3:
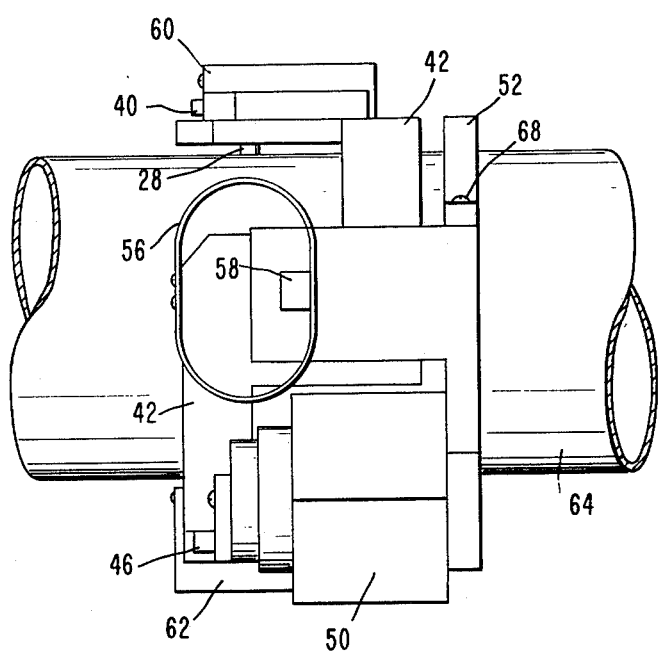
FIG. 3 is the gimbal mechanism of the prior Figure engaged to the outer cylinder, a view otherwise shown, but with sparse detail, in FIG. 1.
Figure 4:
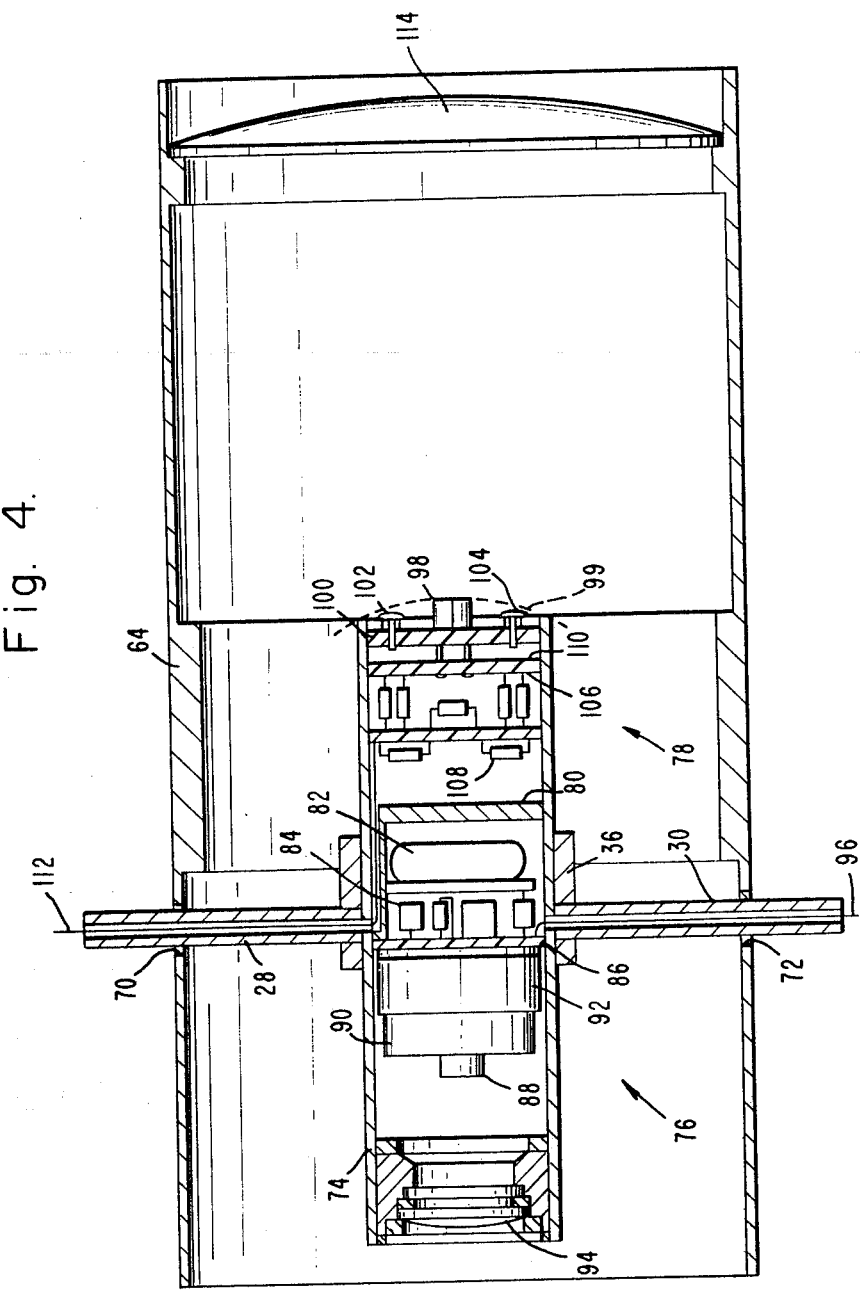
FIG. 4 is a side sectional view of a cylindrical transceiver mounted within the outer cylinder of a communicator by means of the present inventive concept illustrating the general electronics and positioning of the transceiver within the outer cylinder.

Turning to FIGS. 3 and 4, one can see the gimbaling apparatus operationally attached to the outer cylinder (FIG. 3) and, interior thereto, attached to the transceiver defining an inner cylinder (FIG. 4) of the optical communicator. It can be seen in FIG. 3 that the major portion of the gimbaling apparatus is mounted exterior to the outer cylinder 64. The housing clamp ring 52 is affixed to the cylinder 64 by manual tightening of screws 66, 68. The tensioning occasioned thereby enables the ring 52 to provide a fixed base for movement of portions of the gimbaling mechanism relative to the cylinder 64. It will be seen that this, in turn, allows the automatic movement or repositioning, of the transceiver relative to the hand-held outer cylinder. Thin cylindrical shafts 28, 30 extend into the cylinder 64 through opposed slots 70, 72 in the body of the cylinder 64, allowing relative movement between the holder 26 and the outer cylinder 64. Referring to FIG. 4, the (hollow) interior of the (outer) cylinder 64 is shown with a transceiver 74, secured by means of the holder 26, with the (outer) cylinder 64. The (inner) cylinder or optical transceiver 74 is secured to the holder 26 by the tensioning of the fastening screw 38 (lower clamp 36) and the fastening screw 34 (upper clamp 32).

The transceiver 74 is divided internally into a transmitter section 76 and a receiver section 78 separated by an internal partition 80. The transmitter section 76 includes a ring up transformer 82 which provides power to the pulser electronics 84 and mounted on a printed circuit board 86. The aforementioned serve to drive a compact GaAs laser 88 which is mounted on heat sink 90 and holding fixture 92. A transmitter lens system 94 serves to maintain a predetermined solid angle of optical transmission. This angle, the significance of which is mentioned supra, depends upon the range and the degree of security required in a particular application. A conductor 96 provides electrical connection between the transmitter and the operator microphone.

The optical center of the transmitter lens system 94 is intersected by the coincident axes of the cylinder 64 and the cylindrical transceiver 74. Also coincident therewith is the center of the IR quadrature (i.e. four equal segments) detector 98 of the receiver section 78. The detector 98 may be either an avalanche detector or a PIN detector. The selection of an appropriate detector technology hinges upon signal-to-noise ratio considerations. An avalanche detector is most desirable in low background noise applications due to its internal current gain. Unfortunately, the current gain of the avalanche detector acts upon both signal and noise. Thus, while signal current is multiplied by a factor M (set by adjusting the dc bias level of the quadrature detector 98), the detector noise current, which is a function of the background return and detector internal leakage current, is multiplied by $M^d$, where d can vary from 1.5 to 2. Therefore, as the multiplication factor of the detector 98 is increased, the system S/N ratio is decreased. Generally, the limit of multiplication a system can tolerate is reached when the detector noise (with background) equals the receiver preamplifier noise. As the field-of-view is increased, the background noise begins to increase proportionately with the square thereof, and a background noise limiting situation is rapidly approached. A theoretical cross-over point, easily calculable, is then reached at which a PIN detector will provide a more favorable S/N ratio than an avalanche detector. The existence of such cross-over point is partially a reflection of the greater quantum efficiency of the PIN detector.

The quadrature detector 98 is mounted upon a nonconductive washer 100. The washer 100, and the associated detector 98 are manually repositioned by adjustment of the alignment screws 102, 104 to assure that the detector 98 remains within a predetermined focal spherical surface 99 when rotated in the elevation plane. The output of the detector 98 is applied to the preamplifier 106 mounted upon the printed circuit boards 108, 110. The function of the preamplifier electronics 106 is further described and illustrated in schematic detail in FIG. 5. A conductor 112, such as insulated copper wire, provides an electrical path to the receiver electronics and earphones of the listener.

A spherical mirror 114 is positioned at the rear or closed end of the (outer) cylinder 64. The quadrature detector 98 is located at the focus (approximately one-half the radius of curvature) of the mirror 114 and, as mentioned above, constrained to movement substantially within its focal sphere 99. This path assures that a uniform, minimum diameter, blur circle (i.e. image of laser light) will be focussed upon the detector 98 at all times regardless of the relative orientations of the cylindrical transceiver 74 and the cylinder 64, when tracking.

Figure 5:
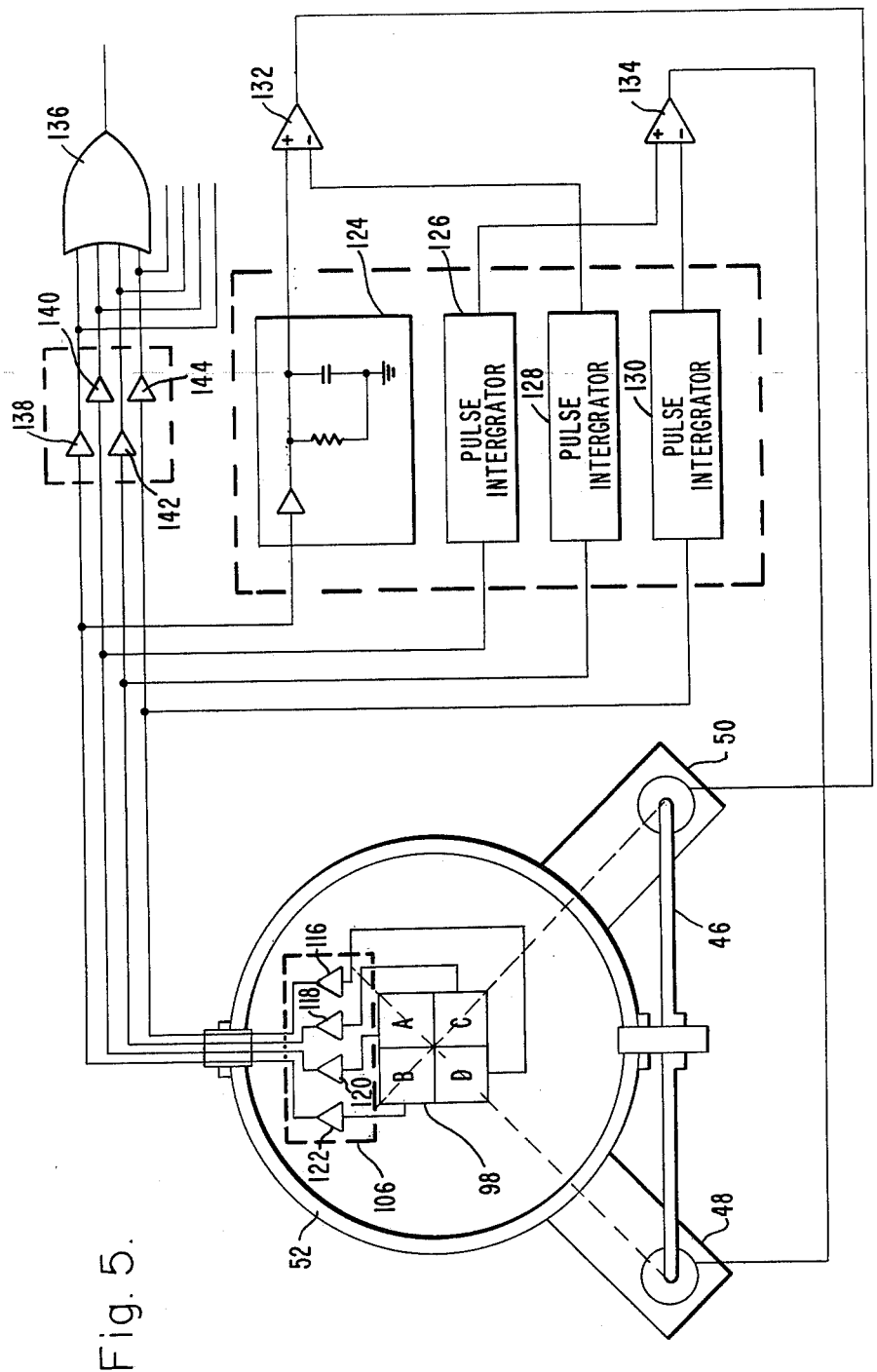
FIG. 5 is an electrical schematic diagram of the positioning mechanisms of the present invention.

The circuitry associated with the gimbaling mechanism is shown schematically in FIG. 5. The quadrature detector 98 is composed of four equal segments labelled A, B, C, and D. The segments B and C define a diagonal axis lying in a plane which includes the contact point of the actuator 50 with the actuator arm 46 while the segments A and D define a diagonal axis, orthogonal thereto, falling in a plane which includes the contact point of the actuator 48 and the actuator arm 46. The two diagonal axes, thus defined, are oriented 45 degrees from the mechanical axes formed by the physical connection of the gimbal ring 42 and the clamp ring 52 by means of the centering springs 54, 56, 60, and 62.

The signal (blur circle) received by (focussed upon) an individual segment A, B, C, or D of the detector 98 generates a current which is amplified by the corresponding circuitry of the preamplifier electronics 106 including circuits 116 (Segment D), 118 (Segment C), 120 (Segment A), and 122 (Segment B). The current is fed into the four separate fast attack, slow decay pulse integrators 124, 126, 128 and 130 to produce corresponding voltages which are compared, A to D and B to C, in the differential amplifiers 134 and 132, respectively. The voltage outputs of the amplifiers 132, 134, are proportional to the differences between the two inputs thereto and will, according the sense or sign (positive or negative) of such difference produce, either "push" or "pull" mechanical actuator action upon the subsequent energizing of the appropriate controlling actuator coil. The communication or data signal is extracted from the detector 98 by combining the four (A, B, C and D) quadrant outputs in the OR gate 136 (after thresholding the signals through the comparators 138, 140, 142, and 144 to ascertain whether or not signal, as opposed to background noise, was received). The output of the OR gate 136 is then applied to the listener's receiver demodulator electronics which, as stated above, may be located in the headset electronics.

Figure 6A:
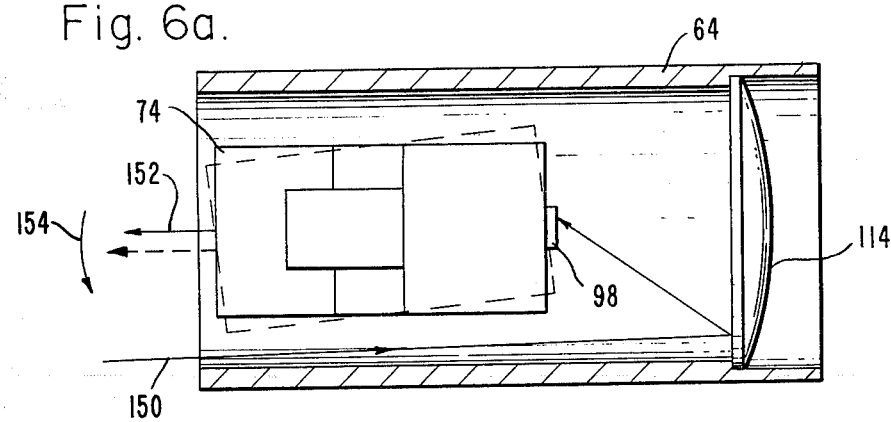
FIGS. 6a and 6b illustrate the operation of the present invention with respect to the automatic alignment of an optical transceiver which is otherwise misaligned to an incoming laser transmission in the horizontal plane.
Figure 6B:
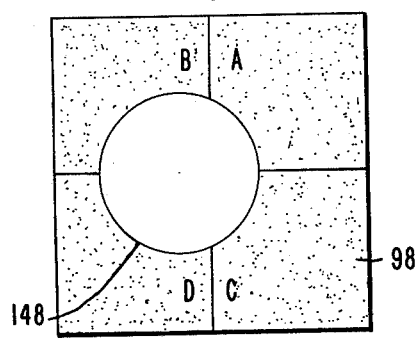
Figure 7B:
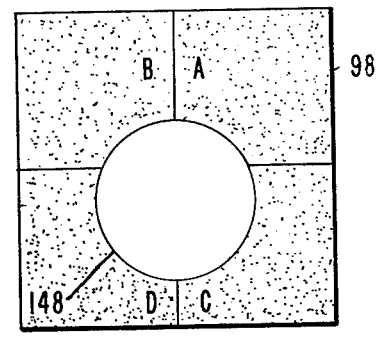
FIGS. 7a and 7b illustrate the operation of the present invention with respect to a transceiver misaligned in the vertical plane in the manner to the horizontal misalignment of FIGS. 6a and 6b.
Figure 7A:
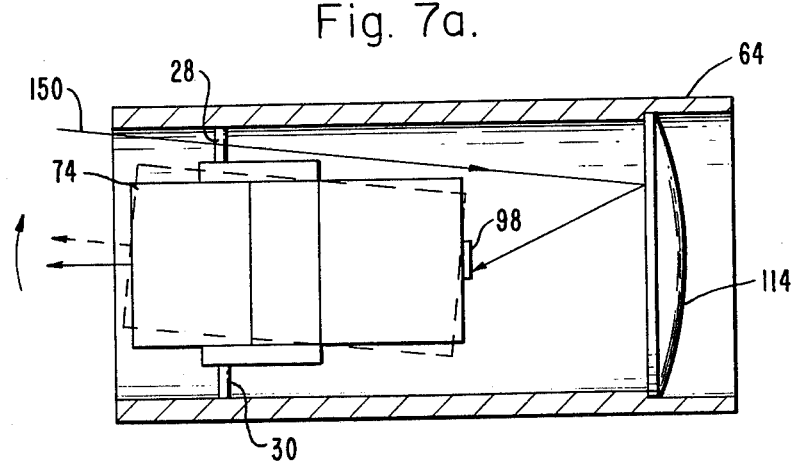

The reciprocal tracking self-alignment process of the present invention may be observed with regard to two specific situations illustrated in FIGS. 6a and 6b and FIGS. 7a and 7b. "Reciprocal tracking" may be defined as a tracking scheme by which the listener senses the direction in space of electromagnetic emissions from a transmitting terminal and retrodirects his transmission in the same direction whereby a communication link is maintained. In each of FIGS. 6b and 7b there is shown the blur circle 148 of received optical energy reflected to and superimposed upon the quadrature detector 98 from the spherical mirror 114 while FIGS. 6a and 7a illustrate the corresponding misalignment of the communicator to incoming optical energy pulsed along the laser transmission path 150. Referring specifically to the situation depicted in FIGS. 6a and 6b, there is shown in FIG. 6a a top view of an optical communicator temporarily misaligned in the azimuthal plane during a reception-transmission. Both the outer cylinder 64 and the transceiver 74 are aligned at an oblique angle to the laser path 150 and thus, a subsequent narrow field-of-view transmission along path 152 is likely to be misdirected. As a consequence of the lack of alignment of the two distant transceivers, the reception of the transmission may additionally be subject to interruption and distortion.

The blur circle 148 occasioned by the misalignment of FIG. 6a is shown in FIG. 6b. A larger portion of the incident optical energy falls upon sections B and D than sections A and C of the quadrature detector 98. Referring back to the circuitry of the FIG. 5, it can be seen that this distribution of signal will result in a positive voltage output from the differential amplifier 132 (B greater than C) and a negative voltage from the differential amplifier 134 (D greater than A). These signals will, in turn, cause the actuator 48 to "push" upon the differential actuator bar 46 and the actuator 50 "pull" upon the differential actuator bar 46. The net result of the two simultaneous forces will be a pure rotation of the transceiver 74 in the direction indicated by the curved arrow 154. This movement will end when the transceiver 74 has been rotated to the position indicated by dashed outlined. No signal is applied from the differential amplifiers 132, 134 and the actuators 48, 50—as the blur circle 148 is then centered in the middle of the quadrature detector 98.

In FIG. 7a there is presented a side view of the transceiver 74 and outer cylinder 64 misaligned in the elevation plane with respect to the direction of the transmission 150. The resulting blur circle 148 of FIG. 7b is seen to be centered in the lower half of the detector 98. Thus, a greater amount of optical energy is focussed upon the quadrants C and D than upon A and B. Referring again to the schematic of FIG. 5, this imbalance can be seen to result in a negative voltage output from both the differential amplifier 134 (D greater than A) and the differential amplifier 132 (C greater than B). Both the actuator 48 and the actuator 50 are thereby energized to "push" upon the differential actuator bar 46, to tilt the transceiver 74 to the position indicated by the dashed outline. The mechanical action of the actuators 48, 50 continues until the optical axis of the transceiver 74 is aligned parallel to the line of sight of the incoming transmission 150. At such time the blur circle will be centered upon and equally shared by the four quadrants of the detector 98.

Thus, it is seen that there has been brought to the communications art improved apparatus for achieving automatic reciprocal tracking between two distant optical transceivers. A pair of speaker-listeners may employ the tracker of the present invention to maintain a substantially coincident line-of-sight therebetween, thereby achieving maximum (uninterrupted) communication with a narrow field-of-view transmission. The maintenance of transceiver alignment in a hostile environment with a limited spatial distribution of signal is thereby achieved by the present invention.

By means of a system incorporating the invention one may obtain substantially uninterrupted narrow field-of-view transmission between one or more hand-held or other-wise unstable communicators. Other arrangements within the intention of the present invention, including but not limited to those which employ physically independent transmitter and detector sections wherein the mirror may be moved instead of the receiver and may be affixed to and moved with the transmitter are also contemplated within the scope of the present invention, the scope of which is defined in the appended claims.

I claim:

1. Alignment apparatus for a reciprocal tracking laser communicator system including a cylindrical transceiver having oppositely disposed laser transmitter and detector, the optical axis of said laser transmitter being collinear with the center of said detector, which comprises:

(a) an outer cylinder having an open and a closed end;
    (b) said closed end of said outer cylinder having a spherical, mirrored inner surface;
    (c) means for mounting said cylindrical transceiver within said outer cylinder; and
    (d) means for rotating said cylindrical transceiver relative to said outer cylinder, said means being responsive to optical energy incident upon said detector so that said cylindrical transceiver is automatically aligned to the direction of said incoming signal.

2. Alignment apparatus as defined in claim 1 further characterized in that the detector of said cylindrical transceiver faces said spherical inner surface of said outer cylinder and said transmitter of said transceiver faces said open end of said outer cylinder so that incoming optical signal energy is directed to said detector.

3. Alignment apparatus as defined in claim 2 further characterized in that said detector is confined to movement in the focal sphere of said mirrored inner surface of the closed end of said outer cylinder so that a relatively intense, compact blur circle image is reflected onto said detector.

4. Alignment apparatus as defined in claim 1 further characterized in that said means for rotating said cylindrical transceiver includes electromechanical actuator means, said last named means being responsive to the location of received optical energy on said detector.

5. Alignment apparatus as defined in claim 4 further characterized in that said detector includes four detector quadrants and that said means for rotating said cylindrical transceiver includes quadrant signal comparison means.

6. Alignment apparatus as defined in claim 5 wherein said means for mounting said cylindrical transceiver includes gimbal apparatus, said gimbal apparatus mechanically responsive to said electromechanical actuator means.

7. Alignment apparatus as defined in claim 6 further characterized in that:
(a) said actuator means comprises a pair of actuators spaced 90 degrees apart, each of said actuators in mechanical contact with an actuator bar at end points thereof so that said gimbal apparatus has orthogonal diagonal axes aligned with the diagonals of said four quadrant detector; and
(b) said quadrant signal comparison means includes diagonal signal analysis means so that a corrective signal is generated from the location of said received optical energy on said detector.

* * * * *